United States Patent [19]

Emmel et al.

[11] 4,264,403

[45] Apr. 28, 1981

[54] DISPENSER FOR PROTECTED WRITE-ON LABELS

[75] Inventors: John J. Emmel, Blaine; Paul G. Honl, Maplewood, both of Minn.

[73] Assignee: Minnesota Mining and Manufacturing Company, St. Paul, Minn.

[21] Appl. No.: 23,605

[22] Filed: Mar. 26, 1979

[51] Int. Cl.[3] .............................................. B32B 31/00

[52] U.S. Cl. .................................... 156/511; 156/527; 156/554; 225/38

[58] Field of Search ........................ 156/511, 527, 554; 225/37, 38

[56] References Cited

U.S. PATENT DOCUMENTS

| | | | |
|---|---|---|---|
| 1,626,257 | 4/1927 | Swanson | 225/38 |
| 3,050,224 | 8/1962 | Drolshammer | 225/38 |
| 3,107,193 | 10/1963 | De Neui | 156/527 |

OTHER PUBLICATIONS

Dispenser No. C-31, Publication of Commercial Tape Division, 3M Co., St. Paul, Minn.

*Primary Examiner*—David A. Simmons
*Attorney, Agent, or Firm*—Cruzan Alexander; Donald M. Sell; John C. Barnes

[57] ABSTRACT

A tape dispenser for protected write-on labels from a continuous strip of label stock and transparent pressure-sensitive adhesive tape which is wide enough to cover the label has a frame supporting separate rolls of label stock and tape, a support surface upon which the label is dispensed to permit writing on the label, a pair of blades spaced one above the other such that upon dispensing a length of tape to be laminated to the label the tape may then be grasped to lift the label from the writing surface and sever the label stock against one knife and the transparent tape against the second knife to provide a measured length of tape which will cover the label.

2 Claims, 7 Drawing Figures

DISPENSER FOR PROTECTED WRITE-ON LABELS

BACKGROUND OF THE INVENTION

1. Field of the Invention

This invention relates to an improvement in tape dispensers and particularly in dispensers for label material which can be printed upon and placed on an article surface under a protective tape.

2. Description of the Prior Art

Dispensers have been made and utilized wherein the packing label or the write-on label is laminated to a piece of transparent pressure-sensitive adhesive tape such that the label can be applied to the surface of a package or bottle with the label completely protected by the tape.

One prior device has been a label dispenser wherein the labels were supplied to the dispenser in a stack so one could readily write on the top label of the stack, advance a piece of tape across the stack and apply the pressure-sensitive adhesive coated surface of the tape to the label on the top of the stack and then further dispense and sever the tape whereby a piece of tape would completely cover and provide an overlap around all edges of the label such that it would be completely protected on the receptor surface. The use of stacks of labels, particularly if preprinted, add a certain amount of expense to one of the necessary products for the user. Secondly, the dispenser, when it was moved from place to place, occasionally resulted in the loss of labels from the stack of labels. Further, in dispensing the covering tape it was necessary to adhere the tape to the label in the top of the stack and withdraw a further amount of tape to provide the overlap on the trailing edge of the label prior to severing of the protective tape. This was not an automatic reaction when operating the dispenser and consequently it was not done on occasion and one edge of the label was left exposed.

The present invention thus provides an improved label dispenser and an improved product for the dispenser such that a label may be advanced and positioned for the operator to write upon the label any desired message. The protective tape is then dispensed to a position above the label tape and adhered to the upper surface of the label tape. The protective tape is then raised, which movement causes the label tape to be drawn against the edge of a severing blade, and upon further lifting of the protective tape, the protective tape will engage a severing blade to sever it in a position spaced from the trailing edge of the severed label.

SUMMARY OF THE INVENTION

The present invention relates to a desk top dispenser for protected write-on labels and comprises a supply area for a roll of label material, a supply area for storing a roll of transparent pressure-sensitive adhesive tape, a support area for supporting a length of the label tape in a position such that a message may be written on the label tape, a blade positioned adjacent one edge of the writing surface, and a second blade spaced above and offset from said first blade for severing the protective tape which is dispensed along a path between the blades. The write-on surface of the dispenser has a release coating affording release of an adhesive such that the label stock, if coated with a tacky pressure-sensitive adhesive, can be easily lifted from the surface of the coating.

DESCRIPTION OF THE DRAWINGS

The present invention will be described in detail hereafter with reference to the accompanying drawing wherein.

DETAILED DESCRIPTION OF THE PREFERRED EMBODIMENT

Figure 1:
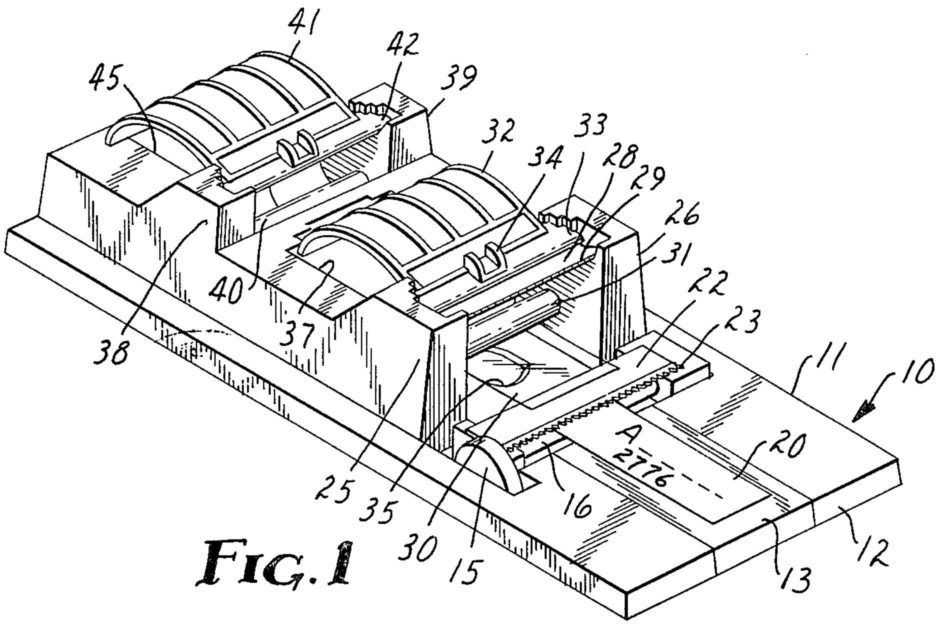
FIG. 1 is a perspective view of a dispenser constructed in accordance with the present invention.
Figure 2:
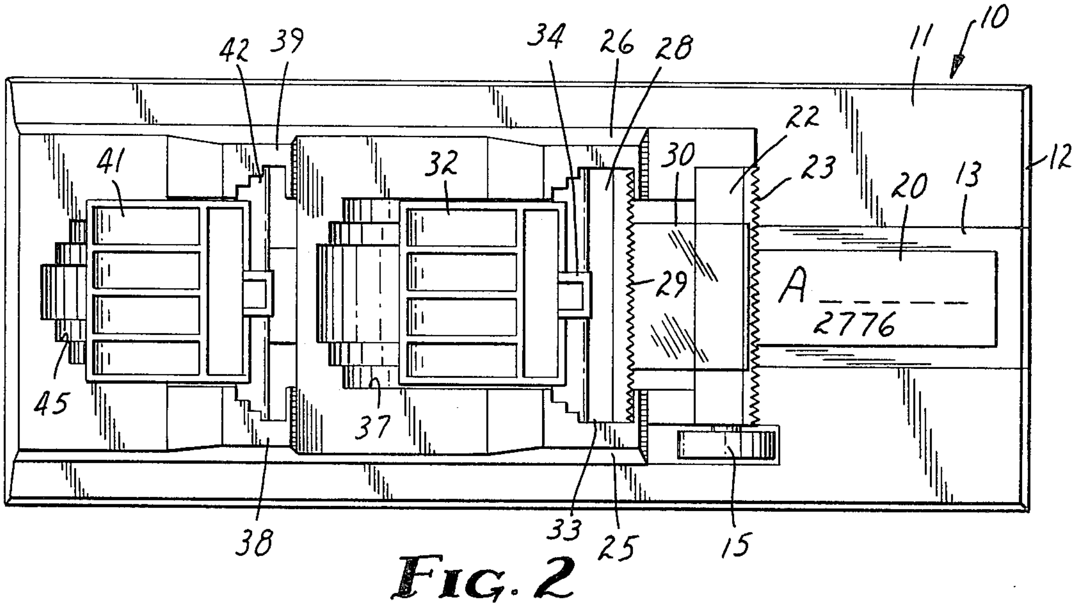
FIG. 2 is a plan view of the dispenser.

Referring now to the drawing there is illustrated a dispenser generally designated by the reference numeral 10, which comprises a generally rectangular frame 11 having a forward edge 12 adjacent which is disposed an upper table-like surface of the frame 11 and a generally rectangular surface 13 for supporting the label. This surface is a nonadherent surface so pressure-sensitive tapes can be readily removed therefrom. This surface may be defined by a piece of pressure sensitive adhesive tape having the surface opposite the pressure sensitive adhesive coated with a release substance such as that used on a silicone release liner. Alternatively, the surface or entire frame may be polyethylene, polytetrafluoroethylene, or other polymer which will release the particular pressure sensitive adhesive used on the label tape. Adjacent the surface 13 is a manually operable drive roller 15 which drives a shaft 16 when moved in a clockwise direction to advance a length of the label tape 20 onto the surface 13. The label tape could be advanced by other drive means or could be dispensed from a mechanical or electronic printer. The length of this strip of label tape is determined by the advancement of the roller 15 and the rotational movement of the shaft 16. The label tape 20 is forced into engagement with the shaft 16 by the undersurface of a metallic blade 22 having a cutting edge 23. The cutting edge 23 is serrated such that it can sever the label tape 20 upon the same being drawn into engagement therewith and twisted slightly.

Figure 3:
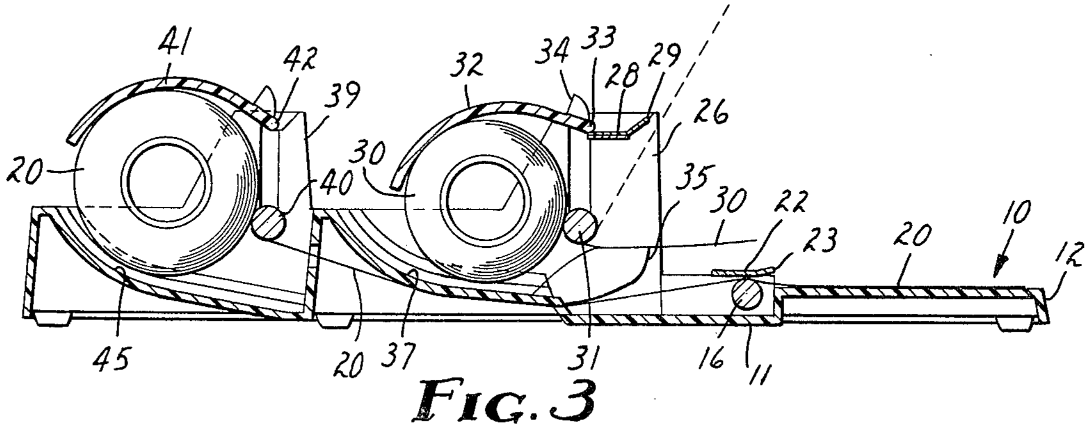
FIG. 3 is a longitudinal vertical sectional view of the dispenser.

A pair of transversely spaced standards 25 and 26, molded integrally as part of the frame, are disposed rearward of the blade 22. The standards 25 and 26 support a second severing blade 28 having a cutting edge 29 thereon for severing a length of transparent pressure-sensitive adhesive coated protective tape 30. The standards 25 and 26 also support a rotatable bar 31 which engages the peripheral surface of a roll of tape 30. The roll of tape 30 is disposed under a cover member 32 which is hinged on the standards 25 and 26 about a pivot axis 33 formed by trunions molded with the cover 32. The cover 32 is provided with a projection 34 which engages the upper surface of the blade 28. This projection and blade bias the cover 32 down into engagement with an upper peripheral surface of the roll of tape 30 as illustrated in FIG. 3.

Disposed centrally of the path for the pressure-sensitive coated protective tape 30 is a finger 35 which positions the free end of the roll of tape after the same has been severed against the edge 22 such that it may be readily grasped for a further length of the tape to be dispensed therefrom.

The roll of tape 30 is supported in a recess 37 formed in the frame 11 rearwardly of the standards 25 and 26 and beneath the cover 32.

Rearward of the recess 37 is an additional pair of standards 38 and 39. The standards 38 and 39 support a rotatable bar 40 and a hinged cover 41 which pivots about an axis 42. Between these standards 38 and 39 is a second recess 45 which receives a roll of the label tape 20.

The label tape is fed from the roll beneath the idler roll 40 forwardly, beneath the recess 37, over the drive roll 16 onto the writing surface 13. The write-on label tape may have printed indicia thereon plus space to write a particular identifying number of other indicia. Preferably the label tape has a coating of pressure-sensitive adhesive which has lower tack than the adhesive on the protective tape 30, and such a low tack adhesive is described in U.S. Pat. No. 3,691,140, issued Sept. 12, 1972 to Silver and assigned to the assignee of this application.

Figure 4:
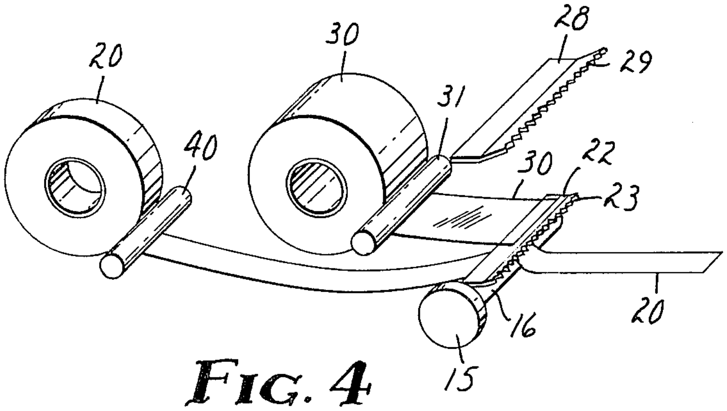
FIG. 4 is a schematic view of the dispenser with the length of the label tape in writing position.
Figure 5:
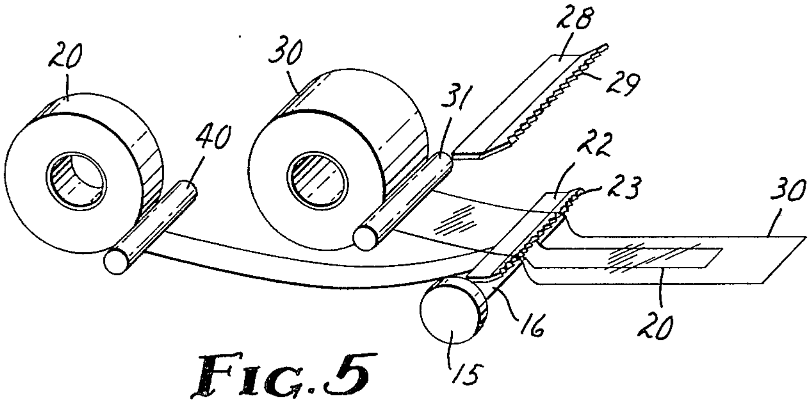
FIG. 5 illustrates the protective tape being dispensed and placed over the label on the writing surface.
Figure 6:
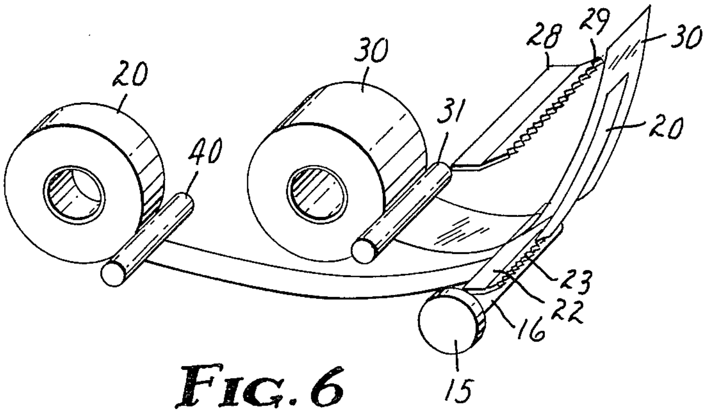
FIG. 6 is a schematic illustration of the protective tape and the label tape being lifted from the writing surface and the label tape being severed by a cutoff blade.
Figure 7:
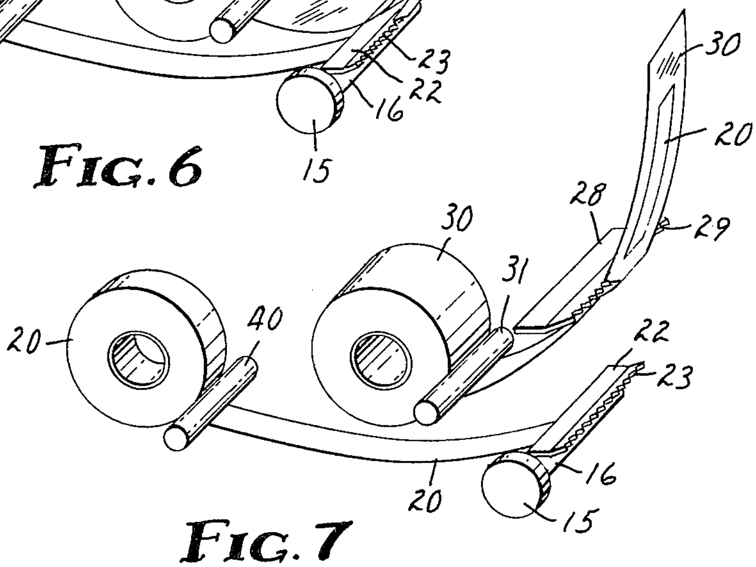
FIG. 7 is a schematic illustration of the protected label and protective tape being drawn into engagement with a second severing blade to sever the protective tape.

The transparent protective tape 30, when threaded in the dispenser extends from the roll beneath the roller 31 to a position above the finger 35. When the writing on the label is completed the operator grasps the protective tape from the position thereof shown in FIGS. 3 and 4 and advances it from the roll to a position extending past the end of the label as illustrated in FIG. 5. Next the operator will grasp the laminated protective tape 30 and the free end of the label tape which is now laminated to the protective tape and lifts the same from the surface 13. This draws the label tape into engagement with the cutting edge 23 to sever the label tape as illustrated in FIG. 6. The laminated protective tape and the severed label is then further lifted to engage the protective tape with the cutting edge 29, and by twisting the tape slightly the same will be severed transversely by the blade 29 as illustrated in FIG. 7.

The label and protective tape may then be applied to a bottle or other container to be labelled. The operator will then rotate the wheel 15 in a clockwise direction to advance the next label from the roll of tape 20 onto the surface 13.

Having described this invention with reference to to accompanying drawing it is to be understood that changes may be made in the design and construction of the dispenser without departing from the scope or the spirit of the invention as defined in the appended claims.

We claim:

1. A desk top dispenser for write-on protective labels comprising a frame having spaced ends, means on said frame for supporting a roll of label tape, a support surface adjacent one end of said frame for supporting a strip of label tape from said roll to afford access thereto, a severing blade disposed transversely of said surface for supporting the label tape and positioned adjacent said surface between said surface and said means for supporting a roll of label tape, means for supporting a roll of transparent pressure-sensitive adhesive tape and for guiding the same along a path to a position adjacent said surface, a second severing edge positioned above the path of said transparent tape and spaced from the first blade in a direction along said path and away from said surface whereby upon manually laminating the protective tape to the label tape and lifting the laminated tapes against the respective severing members the trailing edge of the protective tape will be spaced from the edge of the severed label, and drive means for advancing the label tape onto said surface and beneath said first blade.

2. A dispenser as claimed in claim 1 wherein said means for supporting a roll of label tape and for supporting a roll of transparent tape are spaced along said frame at different distances from said support surface.

* * * * *